Figure 3:
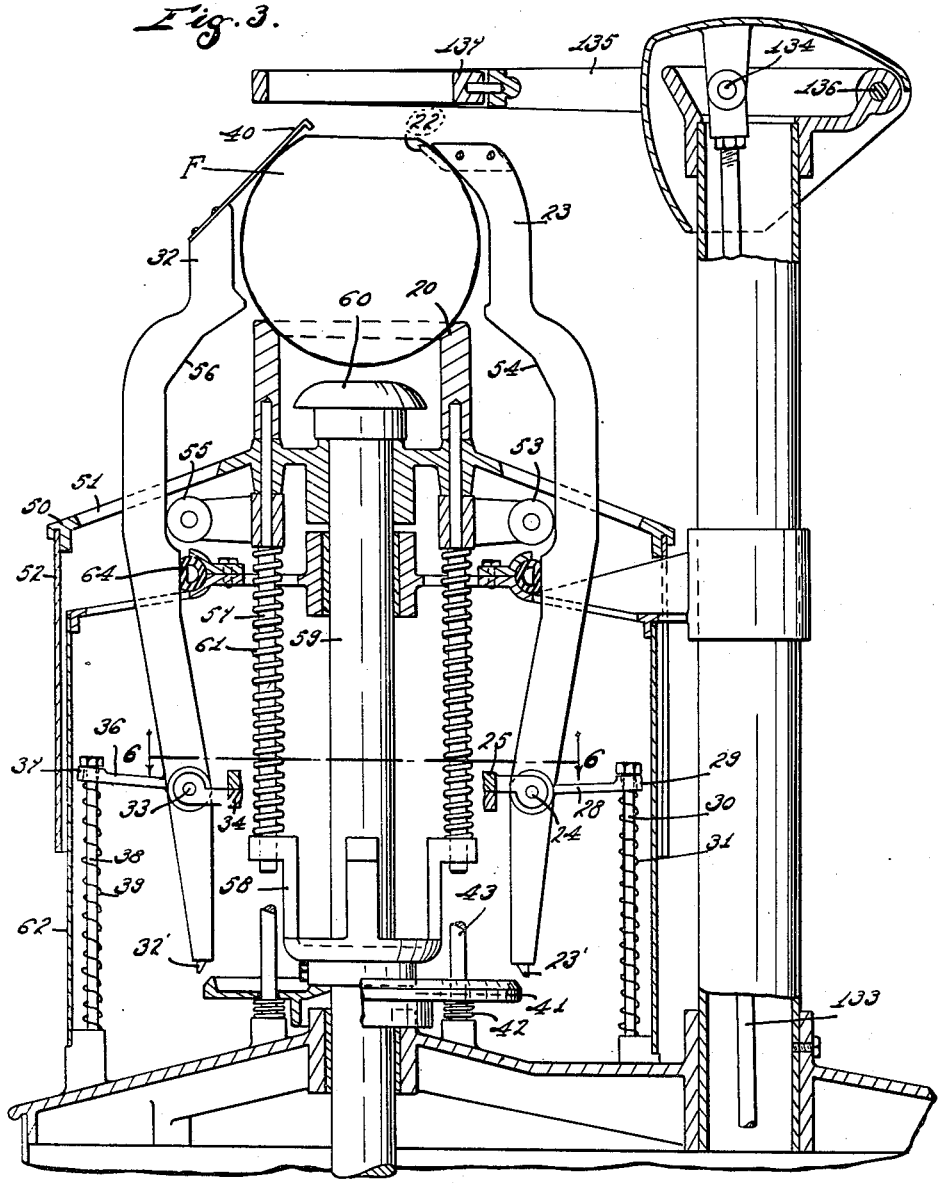

Oct. 27, 1942.                R. POLK, SR                    2,300,312
                              FRUIT PEELER
                           Filed Feb. 2, 1940              5 Sheets-Sheet 1
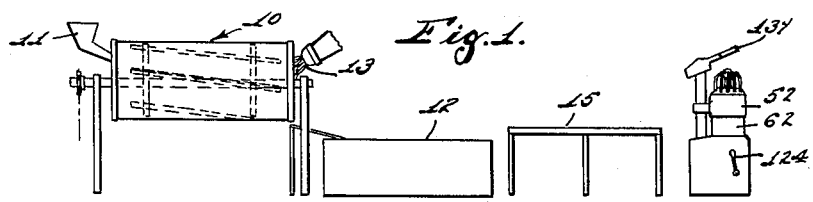
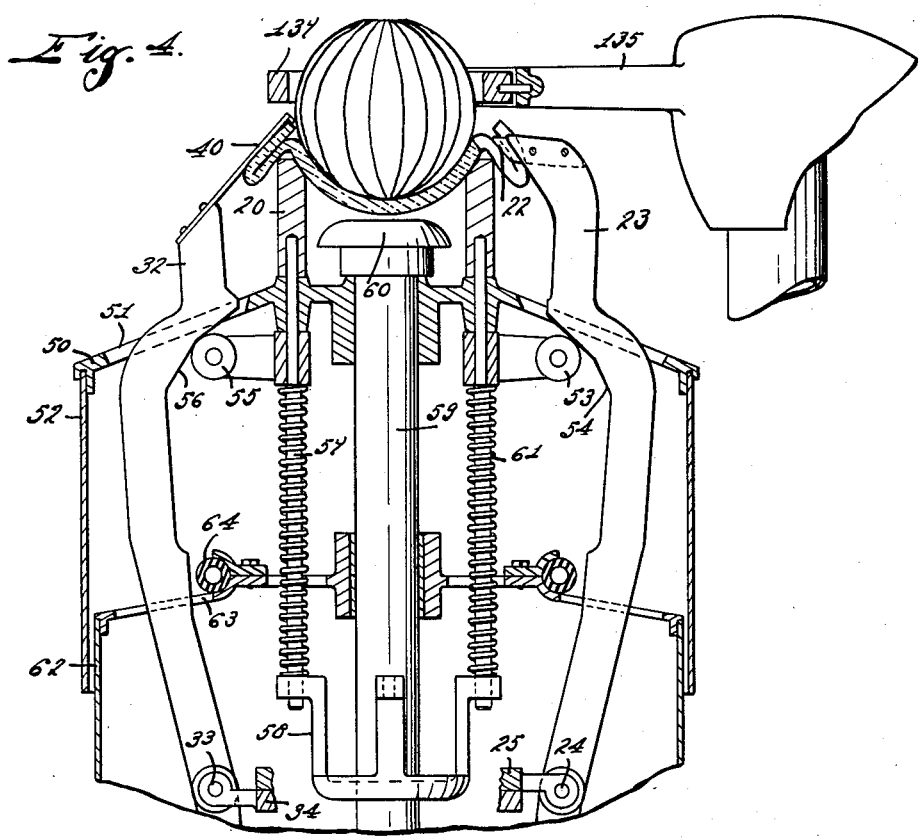
INVENTOR.
Ralph Polk Sr.,
BY
Hood & Hahn.
ATTORNEYS.

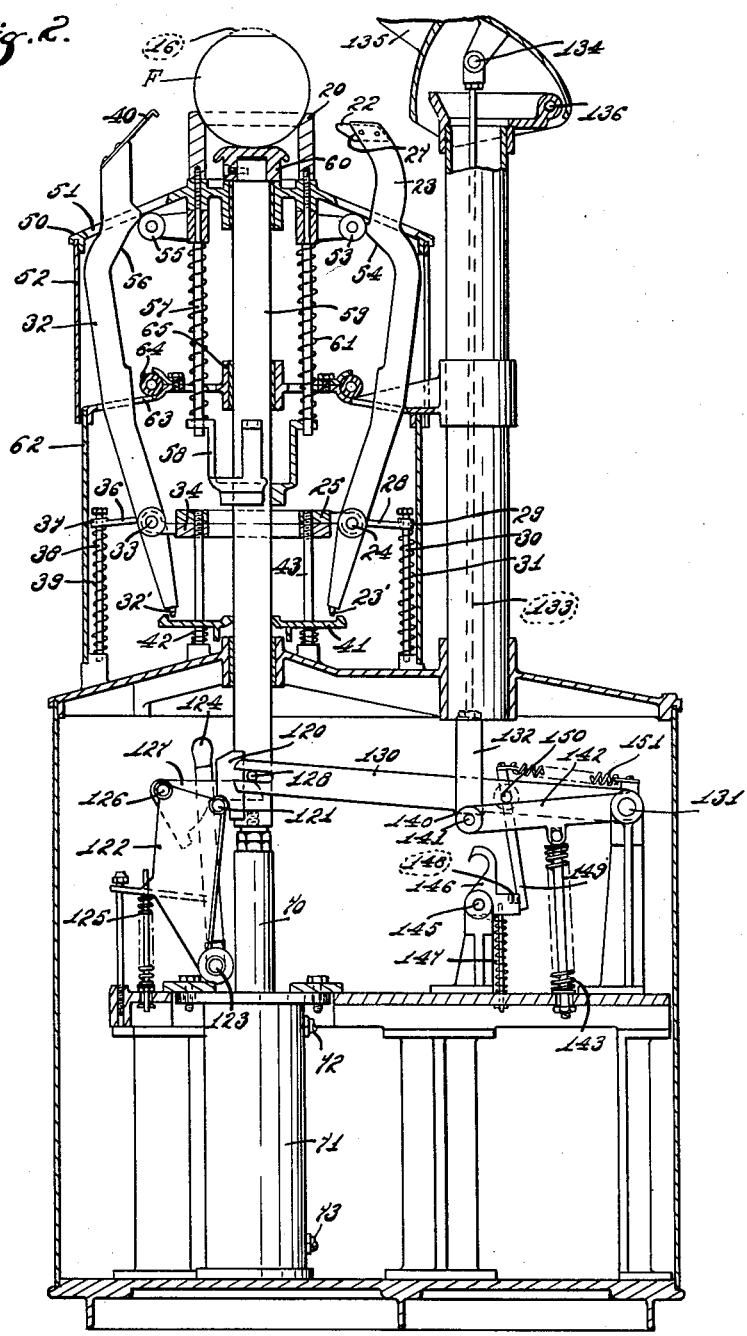

Oct. 27, 1942.　　　R. POLK, SR　　　2,300,312
FRUIT PEELER
Filed Feb. 2, 1940　　　5 Sheets-Sheet 3

INVENTOR.
Ralph Polk Sr.,
BY
Hood & Hahn.
ATTORNEYS.

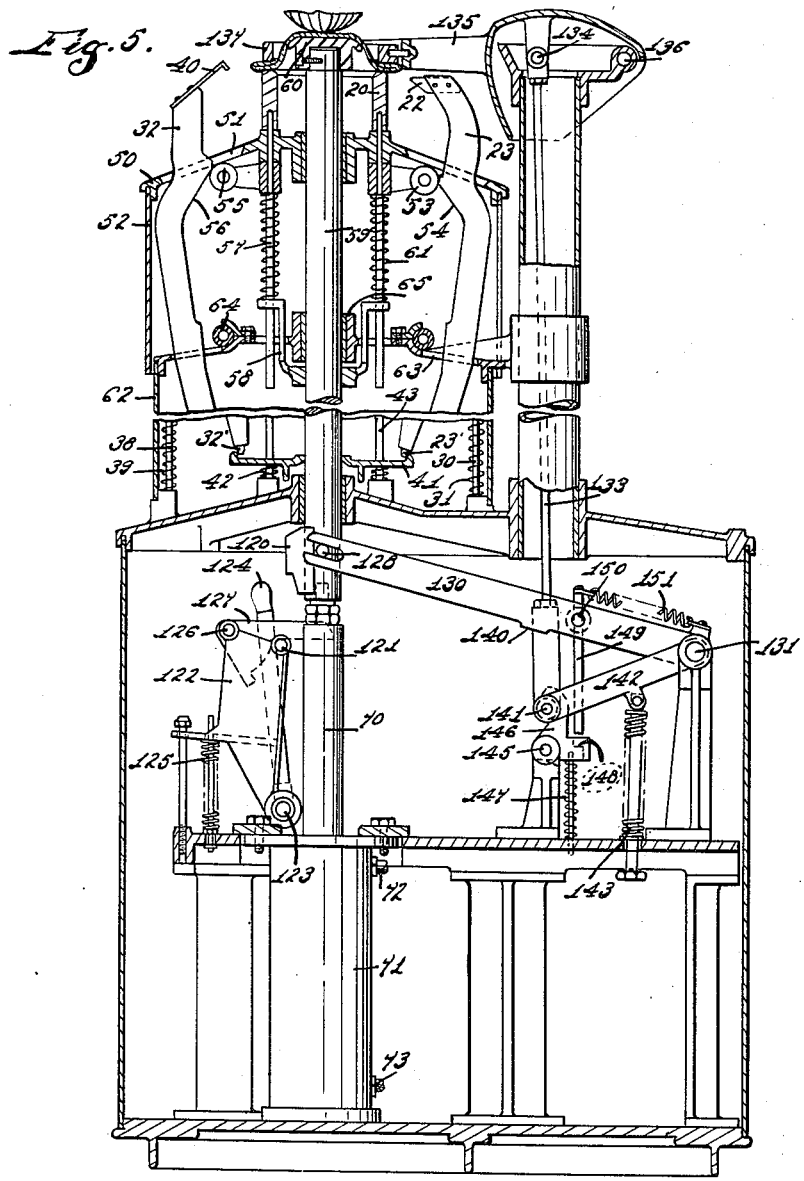

Oct. 27, 1942.    R. POLK, SR    2,300,312
FRUIT PEELER
Filed Feb. 2, 1940    5 Sheets-Sheet 5
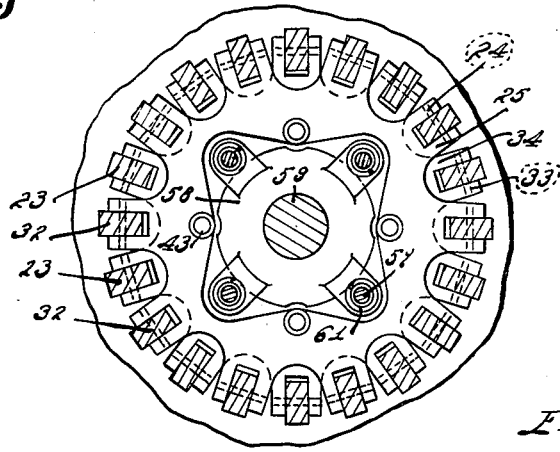
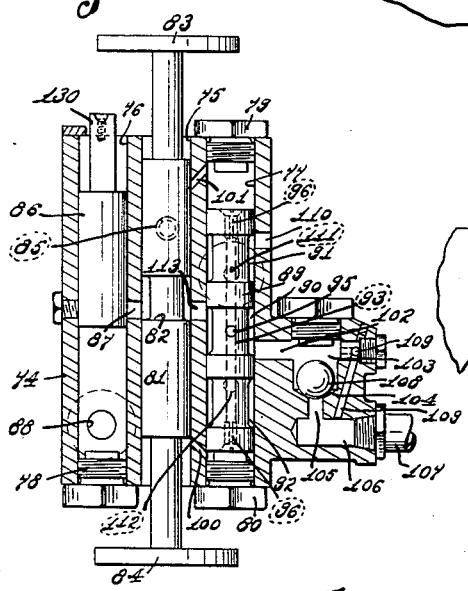
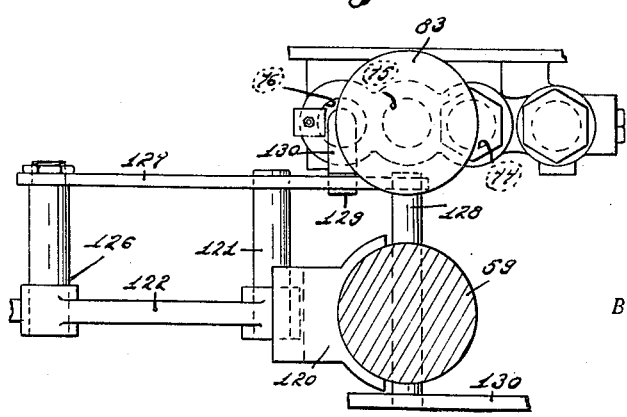
INVENTOR.
Ralph Polk Sr.,
BY
Hood & Hahn.
ATTORNEYS.

UNITED STATES PATENT OFFICE 2,300,312

FRUIT PEELER

Ralph Polk, Sr., Miami, Fla., assignor to The Polk Development Company, Tampa, Fla., a copartnership of Florida Application February 2, 1940, Serial No. 316,905

11 Claims. (Cl. 146—3)

At the present time, in the commercial production of integument-free, substantially whole, segments of citrus fruits, more particularly grapefruit and oranges, the skins are first removed. In a common method of skin removal the whole fruits are submerged in very hot water to wilt the skins, the submergence necessarily lasting (with grapefruit) for seven to ten minutes and unavoidably heating the body of the fruit. Following skin wilting, the heated fruit is immersed in cold water to permit handling, the wilted skin slit with a hand knife and the peel removed by hand.

The object of my invention is to provide a new method and mechanism by means of which undesirable heating of the main bodies of the fruits may be avoided and the skins mechanically removed at greater speed than has heretofore been possible.

The accompanying drawings illustrate my invention:

Fig. 1 is an elevation, diagrammatic in character, of apparatus in which the raw fruit may be subjected to a high temperature dry heat for a relatively short time, promptly cooled and the stem zone of the peeled fruit sliced off;

Fig. 2 an axial section of mechanism by which the wilted skin may be separated from the fruit body, the parts being shown in fruit-receiving position;

Fig. 3 a similar section of the fruit-engaging mechanism, on a larger scale, with the parts in position at the beginning of the peeling operation;

Fig. 4 a fragmentary section of parts shown in Fig. 3 with the parts in their positions when the fruit has been partially denuded and the skin clamped for further fruit ejection;

Fig. 5 a similar section at the completion of the peeling operation;

Fig. 6 a section on line 6—6 of Fig. 3;

Fig. 7 a section of a suitable control valve;

Fig. 8 a plan of the valve and its operator-controlled actuator; and

Fig. 9 an elevation of parts shown in Fig. 8.

In the drawings 10 indicates a fruit-heating chamber, conveniently a rotary drum, the axis of which is slightly inclined from horizontal so that, as the drum is rotated by any suitable means, fruit delivered thereto from chute 11 will be discharged, at the end of a predetermined interval dependent upon the speed of the drum, from the opposite end into a cooling bath 12. The chamber 10 is heated by any suitable means, as by means of a flame 13, so that the exterior of the fruit passing through the chamber is subjected to an intense heat—very much higher than could be furnished by a liquid bath—for a relatively short time—a matter of a few seconds—just long enough to permit the inner surface of the skin to become wilted and thereby loosened from the circumferential integument of the main body of the fruit.

It is desirable to avoid scorching or charring of the exterior of the skin and furnace temperatures should not be too high but may be as high as 1500° F. or higher, the idea being to cause wilting of the inner surface of the skin (at about 200° F.) as quickly as possible because the quicker this wilting is accomplished, the less will be the heat penetration of the fruit body itself and therefore the firmer will be the fruit body for subsequent operations. Promptly following this heating, the fruit is chilled, conveniently in a cold water bath 12. The skin-wilted fruits are removed from the cooling bath to table 15 and a zone 16 (dotted lines Fig. 2) of the wilted skin is sliced off. I find that the best results are attainable if this zone 16 is at the stem pole of the fruit and consequently the zone removal is most easily accomplished by a manual operation following chilling. The wilting operation, by means of relatively high temperature heat applied for a relatively short time, toughens the skin so that, in further handling, it does not as readily crack as when the skin has been wilted and loosened by a hot water bath.

After removal of the stem zone of its wilted skin, the fruit is placed stem end up in the upper end of a ring 20 having an internal diameter slightly less than that of the fruit.

Surrounding ring 20 are several (conveniently 10) skin-slitting knives 22, each carried at the upper free end of a lever 23 pivoted at 24 on a ring 25. At its upper free end each lever 23 adjacent knife 22 forms a shoulder 27 which will engage the wilted skin of the fruit and thus limit the projection of the knife into the skin to the thickness of the skin so that the knife 22 will not cut the surface of the fruit body. Each lever 23, adjacent its fulcrum, has a radial arm 28 having an eye 29 sleeved over a vertical rod 30 and beneath each eye 29 is a spring 31 which serves to yieldingly urge the upper end of its associate lever 23 inwardly toward the axis of ring 20.

The levers 23 are arranged in a circular series around the axis of ring 20 and interdigitated with these levers are similar levers 32 each pivoted, at 33, on a ring 34 similar to ring 25. Each of levers 32 is provided, near its fulcrum, with a radial arm 36 having an eye 37 sleeved over vertical rod 38 and yieldingly urged upwardly by spring 29. Each lever 32 is provided, at its upper end, with a raker finger 40 adapted to engage a segment of the fruit skin, defined by the two adjacent slitting knives 22, in a downward direction.

The lower arm of each lever 23 is provided with a latch finger 23' and the lower arm of each lever 32 is provided with a similar latch finger 32' and these latch fingers 23' and 32' may be engaged, at times, to prevent inward swing of the upper ends of their respective levers by a latch disc 41 yieldingly urged upwardly by springs 42. The collars 25 and 34 are held in vertical position by rods 43.

Ring 20 is carried by a housing 50 provided with radial slots 51 through which the upper ends of levers 23 and 32 are projected and also provided with a depending circular skirt 52 which encloses said levers. Within said housing and carried thereby is a circular series of cam rollers 53 which engage cam surfaces 54 of levers 23, and a circular series of cam rollers 55 which engage cam surfaces 56 of levers 32. Depending from, and within, housing 50 are guide rods 57, the lower ends of which are slidable in a spider 58 carried by a plunger rod 59 which is coaxial with ring 20 and which is provided, at its upper end, with an ejector head 60 adapted to engage the fruit supported in ring 20. Springs 61 are interposed between spider 58 and housing 50 to normally yieldingly hold housing 50 up against head 60.

Enclosing the lower portions of levers 23 and 32 is a fixed housing 62 over which the lower end of skirt 52 is sleeved. The top housing 62 is provided with a multiplicity of radial slots 63 through which levers 23 and 32 project and, at the top of this housing, I provide a circular bumper ring 64, conveniently of rubber tubing, to limit the inward swing of levers 23 and 32. The top housing 62 is also provided with a bearing 65 through which plunger 59 may reciprocate.

It will be readily understood that proper co-ordinated movements of the various parts, which have been heretofore described, may be caused by various mechanisms, but only one is shown in the accompanying drawings.

The plunger 59 is carried by a piston rod 70 having its piston within a cylinder 71 having a pipe 72 connected with its upper end, and a pipe 73 connected with its lower end. The Figs. 7, 8, and 9 illustrate a valve mechanism for automatically producing a complete reciprocation of plunger 59. This valve mechanism comprises a main body 74 having three parallel bores 75, 76, and 77, the lower end of bore 76 being closed by a plug 78 and the upper and lower ends of bore 77 being closed by plugs 79 and 80, respectively.

Mounted in bore 75 is a piston valve 81 having a medial annular groove 82 and exposed heads 83 and 84 at the upper and lower ends of the valve respectively. A light friction element 85 engaging valve 82 serves to normally hold it in the bore 75 at any position to which it may be pushed by external forces applied to the heads 83 and 84. Mounted in the upper end of bore 76 is a piston valve 86 adapted to cover and uncover a port 87 leading into the middle of bore 75. A main supply port 88 leads into the lower end of bore 76 below valve 86. Mounted in bore 77 is a piston valve 89 having a medial annular groove 90 and upper and lower flanking annular grooves 91 and 92, respectively. Valve 89 is axially bored from end to end as indicated by dotted lines 93 and leading from groove 90 into this bore is a port 95. The upper and lower ends of bore 93 are provided with adjustable valve structures 96 of a well known type, by means of which the rate of flow of air into the upper and lower ends of bore 77 from bore 93 may be controlled. Leading from bore 75 to the lower end of bore 77 is a port 100 which may be covered and uncovered by the lower end of valve 81 and, similarly, leading from the upper part of bore 75 is a port 100 which may be covered and uncovered by the lower end of valve 81 and, similarly, leading from the upper part of bore 75 into the upper end of bore 77 is a port 101 which may be opened and closed by the upper end of valve 81, the said ports 100 and 101 being alternately uncovered to atmosphere by movements of valve 81. Leading from the middle of bore 77 so as to communicate with the annular groove 90 is a passage 102 which leads into the valve chamber 103 having in its lower part a valve seat 104 from which a port 105 leads to a passage 106 connected by pipe 107 with port 72 of cylinder 71.

Seated on seat 104 is a ball valve 108 normally resting on seat 104. Leading from chamber 103, above valve 108, is a bleed passage 109 which leads around seat 104 to passage 106. Leading from bore 77 to atmosphere, in a position to be alternately covered and uncovered by the upper end of valve 89, is a port 110. Also leading from bore 77, opposite groove 91 (dotted lines Fig. 7), is a port 111, said port being so placed relative to port 110 that, when port 110 is uncovered, the port 111, which is connected with port 73 of cylinder 71, permits exhaust from the lower end of cylinder 71 to atmosphere. A port 112 (dotted lines Fig. 7), communicates with bore 77 opposite groove 92 and is so positioned that when valve 89 is in its upper position passage 102 will communicate through groove 92 with port 112 and thence to atmosphere. A port 113 forms a communication between bores 75 and 77, said port being at all times in communication with groove 92.

The normal at rest position of plunger 59 is a little short of its maximum upper position, a block 120 carried by said plunger resting upon a latch pin 121 carried by a latch plate 122 which is carried by a rock-shaft 123 to which is attached a manually operable lever 124, the latch plate being urged to normal locking position, as shown in Fig. 2, by a spring 125. Pivoted at 126 on latch plate 122 is a finger 127 which overlies pin 121 and underlies pin 128 carried by plunger 59. Finger 127 also overlies finger 129 which is carried at the lower end of an arm 130 which depends along the upper part of valve body 74 and is carried by the upper end of valve 86, the arrangement being such that when the parts are in the position shown in Fig. 2, valve 86 will be in the position shown in Fig. 7 where port 87 is covered from the air source 88.

Forked over pin 128 is the outer end of a lever 130 pivoted at 131 and extending through a yoke 132 carried at the lower end of a connecting rod 133, the upper end of which is pivotally connected at 134 with an arm 135 pivoted at 136 and carrying, at its outer end, a skin-clamping ring 137 which overlies ring 20. Lever 130, at an intermediate point 140 (Fig. 2), overlies pin 141 carried by yoke 132 and this pin is also carried by an arm 142 also pivoted at 131 but movable independently of lever 130. Arm 142 is normally urged upwardly by a spring 143. Pivoted at 145 is a latch 146, spring urged counter-clockwise (Fig. 2), by a spring 147 and adapted to engage pin 140. Latch 146 has an upwardly presented shoulder 148 upon which may rest the lower end of an actuator 149 pivoted at 150 on lever 130 and spring urged toward shoulder engaging position by a spring 151.

The normal at rest positions of the parts are shown in Fig. 2 where ring 20 is at its upper limit and the skin-clamping ring 137 is in the upwardly retracted position indicated in Fig. 1. The operator places a wilted-skin fruit F in ring 20, the polar cap of the skin having been removed. Lever 124 is then swung to the left thereby retracting pin 121 from block 120 and the free end of finger 127 from under pin 128. The air pressure in the lower end of bore 76 from air source 88 thereupon moves valve 86 to its upper position, this movement being permitted by reason of retraction of finger 127 from beneath pin 128. Air then flows through 87, 82, 113, 90, 102, 109, 106, 107, 72 to the upper end of cylinder 71 and starts the plunger 59 downwardly thereby retracting rollers 53 and 55 from the cutter arms 23 and raker arms 32 and causing a descent of housing 52 and ring 20 against the action of spring 61. This movement continues until the top of the fruit is below the upper ends of the cutter and raker fingers, at which time collar 58 engages ring 41 to retract said ring from interlocking engagement with the lower ends of the cutter and raker fingers, whereupon springs 39 and 31 serve to swing the upper ends of the raker and cutter arms 32 and 23, respectively, to the positions shown in Fig. 3.

The descent of plunger 59 causes lever 130 to move downwardly to a position where pin 141 will first displace latch 146 counterwise and then permit said latch to overlie pin 141 thereby retaining the skin-clamping ring 137 in the position shown in Figs. 3, 4, and 5.

During the downward movement of plunger 59 valve 89 is in the position shown in Fig. 7 so that air in the lower end of cylinder 71 exhausts through 73, 111, 91, and 110 to atmosphere. At the end of the downward movement of plunger 59 its pin 128 engages head 84 of valve 81 and moves said valve downwardly to cover port 100 and uncover port 101 whereupon air passes through port 95 and bore 93 to act upon the lower end of valve 89 to move said valve upwardly, the air in the upper end of the bore 77 exhausting through port 101. The upward movement of valve 89 connects port 112 with port 102, thus permitting exhaust from the upper end of cylinder 71 through 107, 106, 105, past valve 108, through 103, 102, and 92, to atmosphere. At the same time air flows from 88 through 87, 82, 113, and 111, to the lower end of cylinder 73. During the major portion of the upward movement of plunger 59, housing 52 and rollers 53 and 55 trail the plunger by reason of the action of springs 61 and the fruit is projected upwardly between the cutters and rakers, said cutters and rakers following the contour of the fruit by reason of the shapes of the cams 54 and 56. The skin is thus scored on meridian lines and the segments peeled downwardly by the raker fingers, as indicated in Fig. 4, the skin being wrinkled over ring 20. Just before ring 20 is brought into close contact with the skin-clamping ring 137, the cam rollers 53 and 55, acting on cams 54 and 56, retract the cutters and rakers radially so that the wrinkled down skin is clamped between rings 20 and 137 whereupon further upward movement of ring 20 is blocked, the partially skinned fruit being projected up through ring 137. The upward movement of plunger 59 continues to the position shown in Fig. 5 where the lower zone of the skin is projected upwardly to a nearly flat position so that the operator may readily extract the peeled fruit. At the extreme of the upward movement of plunger 59, its pin 128 engages the upper head 83 of valve 81 thus causing reversal of air flow to cylinder 71 to start plunger 59 downwardly. At the time plunger 59 reaches its upper position (Fig. 5), the actuator 149 overlies shoulder 148 of latch 146 so that, at the beginning of downward movement of the plunger, actuator 149 retracts latch 146 from pin 141 whereupon spring 143 serves to throw ring 137 upwardly from the position where it encircles the peeled fruit, thus permitting the ready removal of the peeled fruit.

The operator releases lever 124 promptly after plunger 59 moves downwardly and pin 128, on its upward movement, passes freely past finger 127, said finger returning promptly to a position in the path of downward movement of pin 128 so that when plunger 59 has proceeded downwardly to the position shown in Fig. 2, finger 127 is moved downwardly by pin 128 to cause the downward movement of valve 86 to cover port 87 and latch 120 blocks further downward movement of plunger 59 ready for another actuation. When the cutter and raker arms are thrown to the positions shown in Fig. 2, as previously described, their lower ends 23' and 32', respectively, slip past the spring pressed locking ring 41 so that said locking ring serves to catch and retain these fingers in the position shown in Fig. 2 ready for another operation.

I claim as my invention:

1. In mechanism for peeling citrus fruits, a cup comprising a ring, adapted to receive an unpeeled fruit, and a bottom, one axially movable relative to the other, a circumferential series of slitting knives arranged to engage the skin of the upper zone of a fruit in said cup, a circumferential series of rakers arranged to engage the upper zone of skin of a fruit within the cup between said knives, means by which said rakers and knives may be caused to traverse the upper zone of such fruit in contact with said skin and toward said cup, means by which the ring and cup bottom may be relatively moved axially to separate the fruit body from the lower skin zone, and means for holding the fruit skin during said relative movement.

2. In mechanism for peeling citrus fruits, a cup comprising a ring, adapted to receive an unpeeled fruit, and a bottom, one axially movable relative to the other, a circumferential series of rakers arranged to engage the upper zone of skin of a fruit within the cup, means by which said rakers may be caused to traverse the upper zone of said fruit in contact with said skin and toward said cup, means by which the ring and cup bottom may be relatively moved axially to separate the fruit body from the lower skin zone, and means for holding the fruit skin during said relative movement.

3. In mechanism for peeling citrus fruits, a fruit-supporting ring, a circumferential series of outwardly movable rakers surrounding said ring and adapted to engage the fruit skin, means for causing relative movement between said ring and said rakers axially of the ring while retaining the rakers in engagement with the fruit skin, an ejector within said ring adapted to engage the fruit, and means for causing relative movement between the ring and ejector axially of the ring to strip the skin from a zone of the fruit body.

4. In mechanism for peeling citrus fruits, a fruit-supporting ring, a circumferential series of outwardly movable rakers surrounding said ring and adapted to engage the fruit skin, a circumferential series of outwardly movable skin-slitting knives interdigitated with said rakers and adapted to slit the fruit-skin on meridian lines, and means for causing relative movement between said ring and said rakers and knives axially of the ring while retaining skin contact.

5. In mechanism for peeling citrus fruits, a fruit-supporting ring, a circumferential series of outwardly movable rakers surrounding said ring and adapted to engage the fruit skin, a circumferential series of outwardly movable skin-slitting knives interdigitated with said rakers and adapted to slit the fruit skin on meridian lines, means for causing relative movement between said ring and said rakers and knives axially of the ring while retaining skin contact, an ejector within said ring adapted to engage the fruit, and means for causing relative movement between the ring and ejector axially of the ring to strip a skin-zone from the fruit body.

6. In mechanism for peeling citrus fruits, a fruit-supporting ring, a circumferential series of outwardly movable skin-slitting knives arranged to engage an exposed skin-zone, means for causing relative movement of the ring and knives axially of the ring to cause skin slitting on meridian lines, means for stripping the slitted portions of the skin axially away from the fruit body and for holding the stripped skin against the ring, an ejector arranged within the ring, and means for causing relative movement between the ring and ejector axially of the ring to strip an unslitted skin zone from the fruit body.

7. In mechanism for peeling citrus fruits, a fruit-engaging plunger, a fruit-supporting ring carried by said plunger and yieldably supported thereon for relative axial movement, a circumferential series of skin-engaging rakers coaxial with said ring, a skin-clamping ring, and means coordinated with the plunger for causing said clamping ring to move into and out of skin-clamping relation with the fruit-supporting ring.

8. In mechanism for peeling citrus fruits, a fruit-engaging plunger, a fruit-supporting ring carried by said plunger and yieldably supported thereon for relative axial movement, a circumferential series of skin-engaging rakers coaxial with said ring, means coordinated with the plunger for radially positioning the rakers upon axial movements of the ring, a skin-clamping ring, and means coordinated with the plunger for causing said clamping ring to move into and out of skin-clamping relation with the fruit-supporting ring.

9. In mechanism for peeling citrus fruits, a fruit-engaging plunger, a fruit-supporting ring carried by said plunger and yieldably supported thereon for relative axial movement, a circumferential series of skin-slitting rakers radially yieldable outwardly and adapted to slit fruit skins on meridian lines through a substantial zone of the fruit, a skin-clamping ring, and means coordinated with the plunger for causing said clamping ring to move into and out of skin-clamping relation with the fruit-supporting ring.

10. In mechanism for peeling citrus fruits, a fruit-engaging plunger, a fruit-supporting ring carried by said plunger and yieldably supported thereon for relative axial movement, a circumferential series of skin-engaging rakers coaxial with said ring, a circumferential series of skin-slitting knives interdigitated with said rakers and adapted to slit fruit skins on meridian lines through a substantial zone of the fruit, means coordinated with the plunger for radially positioning the rakers and knives upon axial movements of the ring, a skin-clamping ring, and means coordinated with the plunger for causing said clamping ring to move into and out of skin-clamping relation with the fruit-supporting ring.

11. In mechanism for peeling citrus fruits, a fruit support, means associated with said support for slitting the fruit skin meridianly to define skin segments, non-cutting raking means associated with said support and adapted to engage and rake the initial ends of the skin segments longitudinally to strip the initial portions of skin segments from the edible body of the fruit toward the support, and means for ejecting the body of the fruit from an unslitted zone of the skin.

RALPH POLK, Sr.